US010528386B2

(12) United States Patent
Yu

(10) Patent No.: US 10,528,386 B2
(45) Date of Patent: Jan. 7, 2020

(54) METHODS, APPARATUSES, AND SYSTEMS FOR CONTROLLING TASK MIGRATION

(71) Applicant: Beijing Zhigu Rui Tuo Tech Co., Ltd, Beijing (CN)

(72) Inventor: Kuifei Yu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 187 days.

(21) Appl. No.: 15/500,045

(22) PCT Filed: Jun. 5, 2015

(86) PCT No.: PCT/CN2015/080844
§ 371 (c)(1),
(2) Date: Jan. 28, 2017

(87) PCT Pub. No.: WO2016/015519
PCT Pub. Date: Feb. 4, 2016

(65) Prior Publication Data
US 2017/0262311 A1    Sep. 14, 2017

(30) Foreign Application Priority Data
Jul. 31, 2014    (CN) .......................... 2014 1 0374500

(51) Int. Cl.
G06F 9/46    (2006.01)
G06F 9/48    (2006.01)
(52) U.S. Cl.
CPC ................................. G06F 9/4856 (2013.01)
(58) Field of Classification Search
None
See application file for complete search history.

(56) References Cited

U.S. PATENT DOCUMENTS 7,080,159 B2 *   7/2006   Chu ........................ G06F 8/20
                                                                709/220
7,379,975 B2    5/2008   Hussmann
                       (Continued)

FOREIGN PATENT DOCUMENTS

CN    102981909 A    3/2013
CN    103634275 A    3/2014
                (Continued)

OTHER PUBLICATIONS

International Search Report for PCT Application No. PCT/CN2015/080844, dated Aug. 4, 2015, 3 pages.

*Primary Examiner* — Kenneth Tang
(74) *Attorney, Agent, or Firm* — Amin, Turocy & Watson, LLP

(57) ABSTRACT

Methods, apparatuses, and systems for controlling task migration are provided. A method for controlling task migration comprises: determining available device difference information of a first device set and a second device set, the first device set comprising one or more user previously-available devices, and the second device set comprising one or more user currently-available devices; determining at least one user previously-available device as a source device according to the available device difference information; and migrating at least one task currently running on at least one source device to at least one user currently-available device. Natural and controllable task migration can be implemented among multiple devices without interrupting a user's use of a task being migrated, thereby improving convenience of use by a user.

28 Claims, 6 Drawing Sheets

(56) References Cited

U.S. PATENT DOCUMENTS

| | | | |
|---|---|---|---|
| 8,412,185 B2 | 4/2013 | Cader et al. | |
| 9,069,607 B1 * | 6/2015 | Gopalakrishna Alevoor | ............. G06F 9/45558 |
| 9,069,608 B2 * | 6/2015 | Antony | ............. H04L 29/08144 |
| 9,378,456 B2 * | 6/2016 | White | ................... G06F 9/4856 |
| 2014/0059494 A1 | 2/2014 | Lee et al. | |
| 2014/0082041 A1 * | 3/2014 | Kurihara | ................ H04L 43/00 709/201 |
| 2014/0282559 A1 * | 9/2014 | Verduzco | ............... G06Q 10/10 718/102 |
| 2014/0359637 A1 * | 12/2014 | Yan | ...................... G06F 9/4881 718/108 |
| 2015/0286511 A1 * | 10/2015 | Mickens | ................ G06F 9/544 719/320 |

FOREIGN PATENT DOCUMENTS

| | | |
|---|---|---|
| CN | 104123191 A | 10/2014 |
| WO | 2012154748 A1 | 11/2012 |

* cited by examiner

METHODS, APPARATUSES, AND SYSTEMS FOR CONTROLLING TASK MIGRATION

RELATED APPLICATION

The present application is a U.S. National Stage filing under 35 U.S.C. § 371 of international patent cooperation treaty (PCT) application No. PCT/CN2015/080844, filed Jun. 5, 2015, and entitled "METHODS, APPARATUSES, AND SYSTEMS FOR CONTROLLING TASK MIGRATION", which claims the benefit of priority to Chinese Patent Application No. 201410374500.1, filed on Jul. 31, 2014, which applications are hereby incorporated into the present application by reference herein in their respective entireties.

TECHNICAL FIELD

The present application relates to the field of communications technologies, and in particular, to methods, apparatuses, and systems for controlling task migration.

BACKGROUND

With the ongoing development of electronic information technologies, new types of user devices keep appearing and the functions of the user devices also keep being upgraded, which makes people's daily work and life more convenient. Moreover, it also becomes an increasingly common phenomenon that a user uses multiple devices. For example, multiple user devices such as a smart phone, a tablet computer, a notebook computer, a smart television, smart glasses, and a smart wristband are present on an individual or around an individual.

In actual work and life, as scenarios change, devices available to a user may be different, and a corresponding solution to how to provide a user with an uninterrupted service on these different devices is desirable.

SUMMARY

A brief overview of the present application is provided below, so as to provide a basic understanding of some aspects of the present application. It should be understood that such an overview is not exhaustive description of the present application, and does not intend to decide critical or important parts of the present application, and also does not intend to limit the scope of the present application. The objective of the overview is merely to provide some concepts in a simplified form, and provide the description as a preface for more detailed description below.

The present application provides methods, apparatuses, and systems for controlling task migration.

In an aspect, an example embodiment of the present application provides a method for controlling task migration, comprising:
  determining available device difference information of a first device set and a second device set, the first device set comprising one or more user previously-available devices, and the second device set comprising one or more user currently-available devices;
  determining at least one user previously-available device as a source device according to the available device difference information; and
  migrating at least one task currently running on at least one source device to at least one user currently-available device.

In another aspect, an example embodiment of the present application further provides an apparatus for controlling task migration, comprising:
  a module for determining available device difference information, configured to determine available device difference information of a first device set and a second device set, the first device set comprising one or more user previously-available devices, and the second device set comprising one or more user currently-available devices;
  a module for determining a source device, configured to determine at least one user previously-available device as a source device according to the available device difference information; and
  a module for controlling task migration, configured to migrate at least one task currently running on at least one source device to at least one user currently-available device.

In still another aspect, an example embodiment of the present application provides a system for controlling task migration, comprising: multiple user devices and the foregoing apparatus for controlling task migration, and the multiple user devices may be communicatively connected to the apparatus for controlling task migration.

In the technical solution provided in the embodiments of the present application, one or more user previously-available devices that are switched from a previously available state to a currently unavailable state may be intelligently found, at least one of the one or more user previously-available devices is determined as a source device, and at least one task currently running on at least one source device is migrated to at least one user currently-available device, so as to implement natural and controllable task migration among multiple devices without interrupting a user's use of a task being migrated, thereby improving convenience of use by a user, and/or improving user experience.

The optional embodiments of the present application are described in detail below with reference to the accompanying drawings, and these and other advantages of the present application become more apparent.

BRIEF DESCRIPTION OF THE DRAWINGS

The present application may be better understood through the description provided below with reference to the accompanying drawings. The same or similar reference numerals are used in all the accompanying drawings to represent same or similar members. The accompanying drawings and the detailed description below are together comprised in the specification and constitute a part of the specification, and are used to further illustrate the optional embodiments of the present application and explain the principles and advantages of the present application. In the accompanying drawings.

Figure 1:
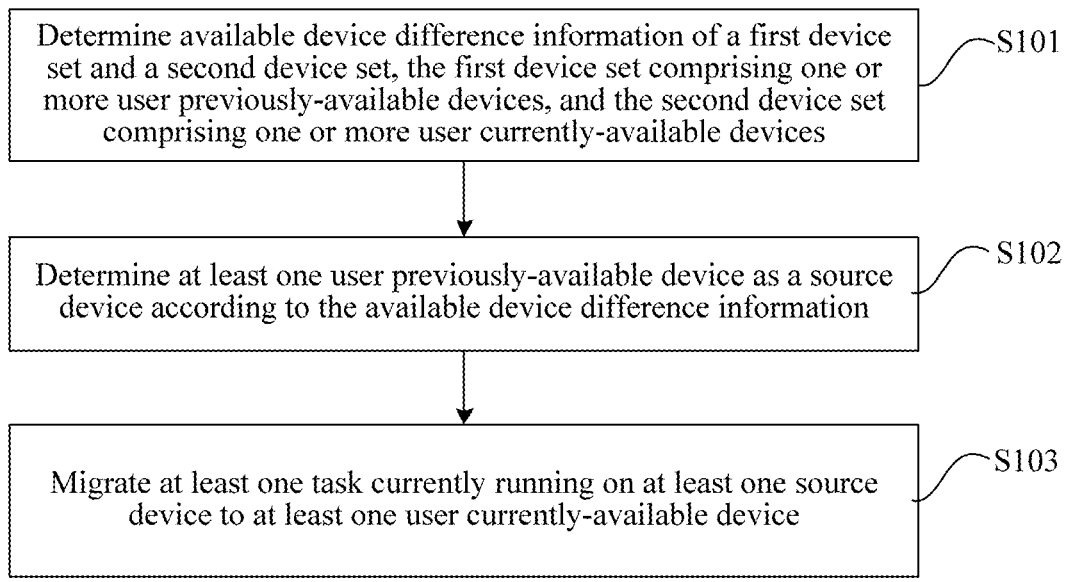
FIG. 1 is a flowchart of a method for controlling task migration provided in an example embodiment of the present application.

A person skilled in the art should understand that the components in the accompanying drawings are merely shown for simplicity and clarity and are not necessarily drawn to scale. For example, the sizes of some components in the accompanying drawings may be enlarged relative to other components, so as to help to improve an understanding of the embodiments of the present application.

DETAILED DESCRIPTION

The example embodiments of the present application are described in detail below with reference to the accompanying drawings. For clarity and simplicity, all features of actual example embodiments are not described in the specification. However, it should be understood that in the process of developing any such actual embodiment, many decisions specific to the example embodiments must be made, so as to achieve specific objectives of developers. For example, those system and service related constraints are met, and these constraints may be changed with different example embodiments. In addition, it should further be understood that although development work may be very complex and time consuming, for a person skilled in the art that benefits from the present disclosure, such development work is merely a routine task.

Here, it should be further noted that, to avoid blurring of the present application due to unnecessary details, apparatus structures and/or processing steps closely related to the solutions according to the present application are merely described in the accompanying drawings and the description, and representation and description of members and processing that are not closely related to the present application and are known to a person of ordinary skill in the art.

The example embodiments of the present application are further described in detail below with reference to the accompanying drawings (same reference numerals in several accompanying drawings represent same elements) and embodiments. The embodiments below are for describing the present application but are not used to limit the scope of the present application.

A person skilled in the art may understand that the terms such as "first" and "second" in the present application are merely for distinguishing different steps, devices or modules, and do not represent any special technical meanings, and also do not represent necessary logic order among the steps, devices or modules.

FIG. 1 is a flowchart of a method for controlling task migration provided in an embodiment of the present application. The method for controlling task migration provided in the present application may be executed by an apparatus for controlling task migration. A device presentation form of the apparatus for controlling task migration is not limited. For example, the apparatus for controlling task migration may be an independent electronic device. Alternatively, the apparatus for controlling task migration may be integrated as a functional module in an electronic device, which is not limited in the embodiment of the present application. Specifically, as shown in FIG. 1, the method for controlling task migration provided in the embodiment of the present application comprises:

Step S101: Determine available device difference information of a first device set and a second device set, the first device set comprising one or more user previously-available devices, and the second device set comprising one or more user currently-available devices.

The "previous" and "current" are for distinguishing two determining moments of different timing. The "available" represents whether a user device is available to a user at a determining moment. A user device available to a user at a first determining moment is the user previously-available device, and the first device set comprises one or more user previously-available devices. A user device available to a user at a second determining moment is the user currently-available device, and the second device set comprises one or more user currently-available devices. For the types, the user device, the user previously-available device, and the user currently-available device in the embodiments of the present application may be, but are not limited to, a mobile phone, a computer, a notebook computer, a tablet computer, smart glasses, a smart watch, a smart wristband, a smart television, a smart loudspeaker, and the like.

Due to influence by one or more factors such as a change of a user position and a change of a user device, the first device set and the second device set may be partially different or completely different. The available device difference information comprises: information of at least one user previously-available device that is switched from a user previously available state to a user currently-unavailable state in the first device set. In other words, the first device set comprises a user device but the second device set does not comprise the user device; therefore, the user device is switched from a user previously available state to a user currently-unavailable state, and the available device difference information comprises information of the user device.

For example, the first device set comprises 3 user previously-available devices, which are separately marked as UD1, UD2, and UD3. The second device set comprises 1 user currently-available device, which is marked as UD3. In this case, the available device difference information of the first device set from the second device set involves UD1 and UD2.

Step S102: Determine at least one user previously-available device as a source device according to the available device difference information.

It is determined which user device or which user devices in the first device set are switched from a previously available state to a current unavailable state, and therefore one or more user previously-available devices may be determined as the source devices. For example, the available device difference information of the first device set from the second device set is UD1 and UD2, and UD1 or UD2 or UD1 and UD2 may be determined as the source devices.

Step S103: Migrate at least one task currently running on at least one source device to at least one user currently-available device.

One or more source devices may be determined. One or more tasks may currently run on each source device. One or more tasks may be migrated. A task may be migrated to one or more user current available devices. For example, video playback task A and instant messaging task B currently running on UD1 are switched on UD3.

In the method for controlling task migration provided in the embodiment of the present application, one or more user previously-available devices that are switched from a previously available state to a currently unavailable state may be intelligently found, at least one of the one or more user previously-available devices is determined as a source device, and at least one task currently running on at least one source device is migrated to at least one user currently-available device. Therefore, without interrupting a user's use of a task being migrated, convenience of use by a user is improved, and user experience is improved.

In the technical solution provided in the embodiments of the present application, the method for determining available device difference information of a first device set and a second device set may be selected according to an actual request or need, so that an example embodiment is very flexible.

In an example embodiment of determining the user device difference information, the apparatus for controlling task migration may acquire user previous position information, user current position information, and user device position information; determine the first device set according to the user previous position information and the user device position information; determine the second device set according to the user current position information and the user device position information; and determine the available device difference information according to the first device set and the second device set. An optional scenario is, for example, that a user moves from position a to position b. The apparatus for controlling task migration may determine user available devices within a certain range of position a (that is, the first device set) and user available devices within a certain range of position b (that is, the second device set) by combining the user position information and the user device position information, and determine a difference of the user available devices comprised in the two ranges (that is, the available device difference information). The user position information and the user device position information may be determined by using, but not limited to, a positioning technology such as GPS. In the solution, a change of a user device available to a user when the user is at a different position may be intelligently discovered (that is, no manual involvement is required in a discovery process) according to position information.

In another example embodiment of determining the user device difference information, the apparatus for controlling task migration may determine the first device set and the second device set through near-field detection; and determine the available device difference information according to the first device set and the second device set. The near-field detection may be implemented by using one or more near-field detection technologies as follows: infrared, visible light communication, WiFi, Zigbee, Bluetooth, and the like. In the solution, it may be intelligently discovered, through near-field detection, which user devices are the user previously-available devices (that is, the first device set), which user devices are the user currently-available devices (that is, the second device set), and the available device difference information between the user previously-available devices and the user currently-available devices (that is, it is determined which user devices are switched from a previously available state to a current unavailable state).

In still another example embodiment of determining the user device difference information, the apparatus for controlling task migration may determine the first device set and the second device set through human bioelectricity detection; and determine the available device difference information according to the first device set and the second device set. The optional scenario is, for example, that the apparatus for controlling task migration may detect human bioelectricity information of a user by using, but not limited to, a sensor, and determine, according to the detected human bioelectricity information, a wearing condition of a wearable device (for example, smart glasses, and a smart watch) of a user. If it is determined that a user is wearing the wearable device at a first detection moment, the wearable device is the user previously-available device. If it is determined that the user is still wearing the wearable device at a second detection moment, the wearable device is the user currently-available device. If it is determined that the user does not wear the wearable device at the second detection moment, the wearable device is not the user currently-available device. In the solution, a change of a user device available to a user may be intelligently discovered by using a technology of human bioelectricity detection.

The foregoing example embodiment of determining the user device difference information may be separately implemented, or may also be implemented in combination. For example, at least two of position information, a near-field detection technology, and a human bioelectricity detection technology may be combined to separately determine the first device set, the second device set, and the available device difference information. The example embodiment is no longer elaborated here in the embodiment of the present application.

After the available device difference information is determined, it may be further determined accordingly that one or more user previous available devices are the source devices, and at least one task currently running on at least one source device is migrated to at least one user currently-available device. Optionally, at least one task to be migrated may be determined according to at least one task currently running on at least one source device; at least one user currently-available device is determined as a destination device; and at least one task to be migrated is migrated to at least one destination device. There may be one or more source devices, one or more tasks may currently run on each source device, there may be one or more tasks that are to be migrated (that is, tasks to be migrated) on each source device, and each task to be migrated may be migrated to one or more destination devices. Therefore, migration of at least one task between a single source device and a single destination device, migration of at least one task between a single source device and multiple destination devices, or migration of at least one task between multiple source devices and multiple destination devices may be implemented, to cause migration of a task to be more natural and smart, so that a variety of application demands of a user may be better met. Further, a mapping relationship between at least one task to be migrated and at least one destination device may be determined; and a corresponding task to be migrated is migrated to a corresponding destination device according to the mapping relationship. For example, a task to be migrated may be migrated to one or more destination devices, or, some tasks to be migrated are migrated to a same destination device. In the solution, task migration is controlled on the basis of the mapping relationship, thereby improving efficiency of controlling task migration.

In the technical solution provided in the embodiments of the present application, the manner of determining a destination device may be determined according to an actual request or need, which is not limited in the embodiment of the present application.

In an example embodiment of determining the destination device, matching information between at least one source device and one or more user currently-available devices may be determined; and at least one user currently-available device of which the matching information meets a predetermined condition is determined as the destination device. The matching information may be determined according to at least one of, but not limited to, a device type, a model, and device capability information. For example, respective device capability information of at least one source device and one or more user currently-available devices may be acquired; and the matching information is determined according to the acquired device capability information. Specifically, device capability information of the source device and device capability information of each user currently-available device may be acquired, and device capability information of any device may comprise, but is not limited to, at least one piece of information as follows: a performance parameter of a human-machine interaction member of a device, a performance parameter of a computation member of a device, a performance parameter of a display member of a device, a performance parameter of a transmission member of a device, battery durability information of a device, a performance parameter of a sensing sensor of a device, and the like. These performance parameters may be separately considered to determine a matching degree, or may also be considered in combination (for example, respective weight values are determined for different performance parameters) to determine a matching degree. The determined matching degree is compared with a preset condition. For example, the user currently-available device of which a determined matching degree is greater than a predetermined threshold is the destination device. In the solution, the user currently-available device that matches the source device well may be determined as the destination device, so as to facilitate subsequent successful migration of a task without interrupting use by a user.

In another example embodiment of determining the destination device, application resource information used for running at least one task to be migrated may be acquired; respective device capability information of one or more user currently-available devices is acquired; and at least one user currently-available device is determined as the destination device according to the application resource information and the device capability information. The application resource information may comprise, but is not limited to, information of an application related resource, and a system resource (for example, memory, and an I/O device) used for running of an application. The device capability information of the user currently-available device is compared with resource information for running of the task to be migrated, and the user currently-available device that is suitable for successful running of the task to be migrated may be determined as the destination device, so as to facilitate subsequent successful migration of the task without interrupting use by a user.

After the destination device is determined, at least one task to be migrated may be migrated to at least one destination device.

In a case where there are multiple tasks to be migrated, distinguished control of task migration may be performed to improve efficiency of task migration and convenience of use by a user. For example, task migration priority level information of multiple tasks to be migrated may be determined; and a corresponding task to be migrated is migrated to at least one destination device according to the task migration priority level information. Different tasks may have different importance and meanings for a user. A priority level of each task to be migrated may be determined according to an actual condition, and a task to be migrated having a relatively high priority level is migrated preferentially, to cause an application resource of the destination device to preferentially meet running of these tasks, so that efficiency of task migration is improved and demands of a user may be better met.

The method for determining priority levels of different tasks to be migrated may be determined according to an actual request or need, and is not limited in the embodiment of the present application. For example, the task migration priority level information may be determined according to the type of the task. Alternatively, for another example, respective user usage information of multiple tasks to be migrated may be acquired; and the task migration priority level information of the multiple tasks to be migrated is determined according to the acquired user usage information. The user usage information may comprise, but is not limited to, information such as the time and frequency of running of a task. In the solution, task migration priority levels of different tasks to be migrated are determined according to the user usage information, so as to preferentially migrate a task with which a user is concerned more, thereby better meeting demands of actual applications of the user.

In a case of multiple destination devices, distinguished control of task migration may also be performed to improve convenience of use by a user. For example, device priority level information of multiple destination devices may be determined; and at least one task to be migrated is migrated to a corresponding destination device according to the device priority level information. Different destination devices may have different use frequencies and use convenience for a user. A priority level of each destination device may be determined according to an actual condition, and the task to be migrated is preferentially migrated to a destination device having a relatively high priority level. For example, a smart phone has a higher use frequency for a user as compared with other user devices such as a smart television and is also often carried along, and therefore the task to be migrated may be preferentially switched to the smart phone to improve convenience of use by the user.

In the embodiment of the present application, migrating a task to a destination device may be determined according to an actual request or need, and is not limited in the embodiment of the present application. For example, the apparatus for controlling task migration may acquire execution state information of the task to be migrated, and send the execution state information to the destination device. The destination device determines an application resource that may present the execution state information, and creates a task in a multi-task list currently running in an operating system of the destination device, so that the migrated task may continue running by using the new task created on the destination device. In this case, content corresponding to the execution state information may be accessed on the destination device. Therefore, without interrupting use by the user, convenience of use by a user is improved and user experience is improved.

A person skilled in the art may understand that in any method above in the example embodiment of the present application, the sequence numbers of the steps do not mean an execution order, where the execution order of the steps should be determined by the functions and internal logic of the steps, and should not constitute any limitation on the example embodiments of the present application.

Figure 2:
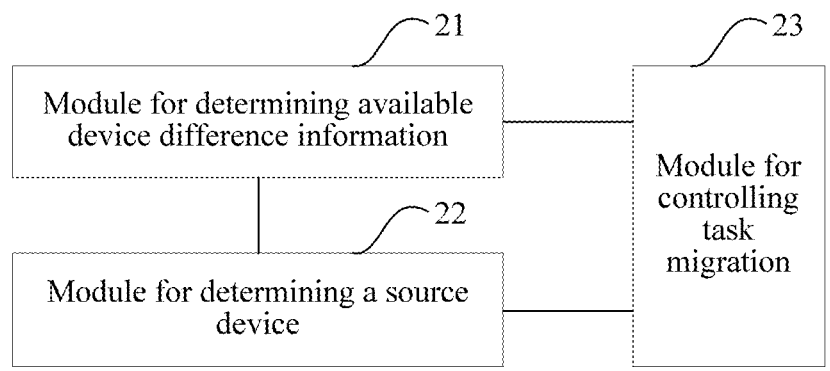
FIG. 2 is a schematic block diagram of a first apparatus for controlling task migration provided in an example embodiment of the present application.

FIG. 2 is a schematic block diagram of an apparatus for controlling task migration provided in an embodiment of the present application. As shown in FIG. 2, the apparatus for controlling task migration provided in the embodiment of the present application comprises: a module 21 for determining available device difference information, a module 22 for determining a source device, and a module 23 for controlling task migration.

The module 21 for determining available device difference information is configured to determine available device difference information of a first device set and a second device set, the first device set comprising one or more user previously-available devices, and the second device set comprising one or more user currently-available devices.

The module 22 for determining a source device is configured to determine at least one user previously-available device as a source device according to the available device difference information.

The module 23 for controlling task migration is configured to migrate at least one task currently running on at least one source device to at least one user currently-available device.

For the apparatus for controlling task migration provided in the embodiment of the present application, one or more user previously-available devices that are switched from a previously available state to a currently unavailable state may be intelligently found, at least one of the one or more user previously-available devices is determined as a source device, and at least one task currently running on at least one source device is migrated to at least one user currently-available device. Therefore, without interrupting a user's use of a task being migrated, convenience of use by a user is improved and user experience is improved.

A device presentation form of the apparatus for controlling task migration provided in the embodiment of the present application is not limited. For example, the apparatus for controlling task migration may be an independent electronic device. Alternatively, the apparatus for controlling task migration may be integrated as a functional module in an electronic device. The electronic device may comprise, but is not limited to, a mobile phone, a computer, a notebook computer, a tablet computer, smart glasses, a smart watch, a smart wristband, a smart television, a smart loudspeaker, and the like.

Figure 3:
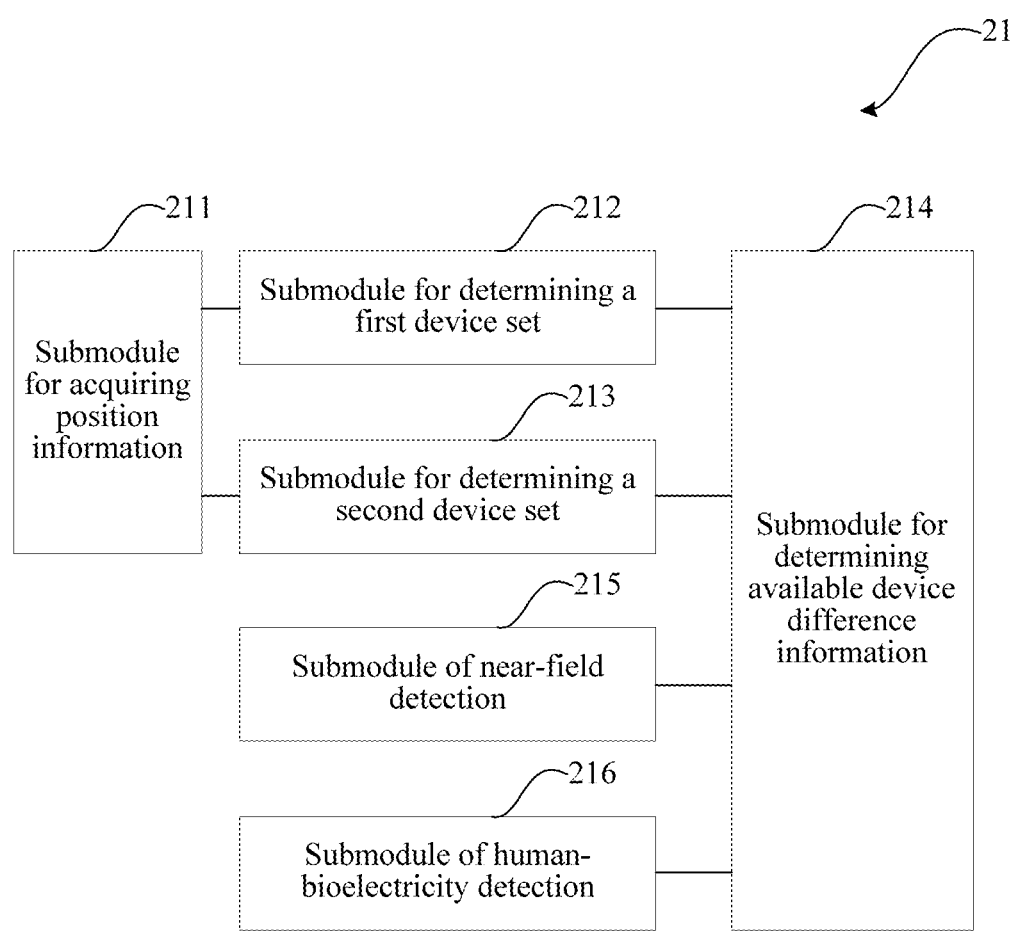
FIG. 3 is a schematic block diagram of a module for determining available device difference information in a second apparatus for controlling task migration provided in an example embodiment of the present application.

Optionally, as shown in FIG. 3, the module 21 for determining available device difference information comprises: a submodule 211 for acquiring position information, a submodule 212 for determining a first device set, a submodule 213 for determining a second device set, and a submodule 214 for determining available device difference information. The submodule 211 for acquiring position information is configured to acquire user previous position information, user current position information, and user device position information. The submodule 212 for determining a first device set is configured to determine the first device set according to the user previous position information and the user device position information. The submodule 213 for determining a second device set is configured to determine the second device set according to the user current position information and the user device position information. The submodule 214 for determining available device difference information is configured to determine the available device difference information according to the first device set and the second device set. In the solution, a change of a user device available to a user when the user is at a different position may be intelligently discovered according to position information.

Optionally, the module 21 for determining available device difference information comprises: a submodule 214 for determining available device difference information and a submodule 215 of near-field detection. The submodule 215 of near-field detection is configured to determine the first device set and the second device set through near-field detection. The submodule 214 for determining available device difference information is configured to determine the available device difference information according to the first device set and the second device set. The near-field detection may be implemented by using one or more near-field detection technologies as follows: infrared, visible light communication, WiFi, Zigbee, Bluetooth, and the like. In the solution, a change of a user device available to a user when the user is at a different position may be intelligently discovered through near-field detection.

Optionally, the module 21 for determining available device difference information comprises: a submodule 214 for determining available device difference information and a submodule 216 of human-bioelectricity detection. The submodule 216 of human-bioelectricity detection is configured to determine the first device set and the second device set through human bioelectricity detection. The submodule 214 for determining available device difference information is configured to determine the available device difference information according to the first device set and the second device set. In the solution, a change of a user device available to a user may be intelligently discovered by using a technology of human bioelectricity detection.

Figure 4:
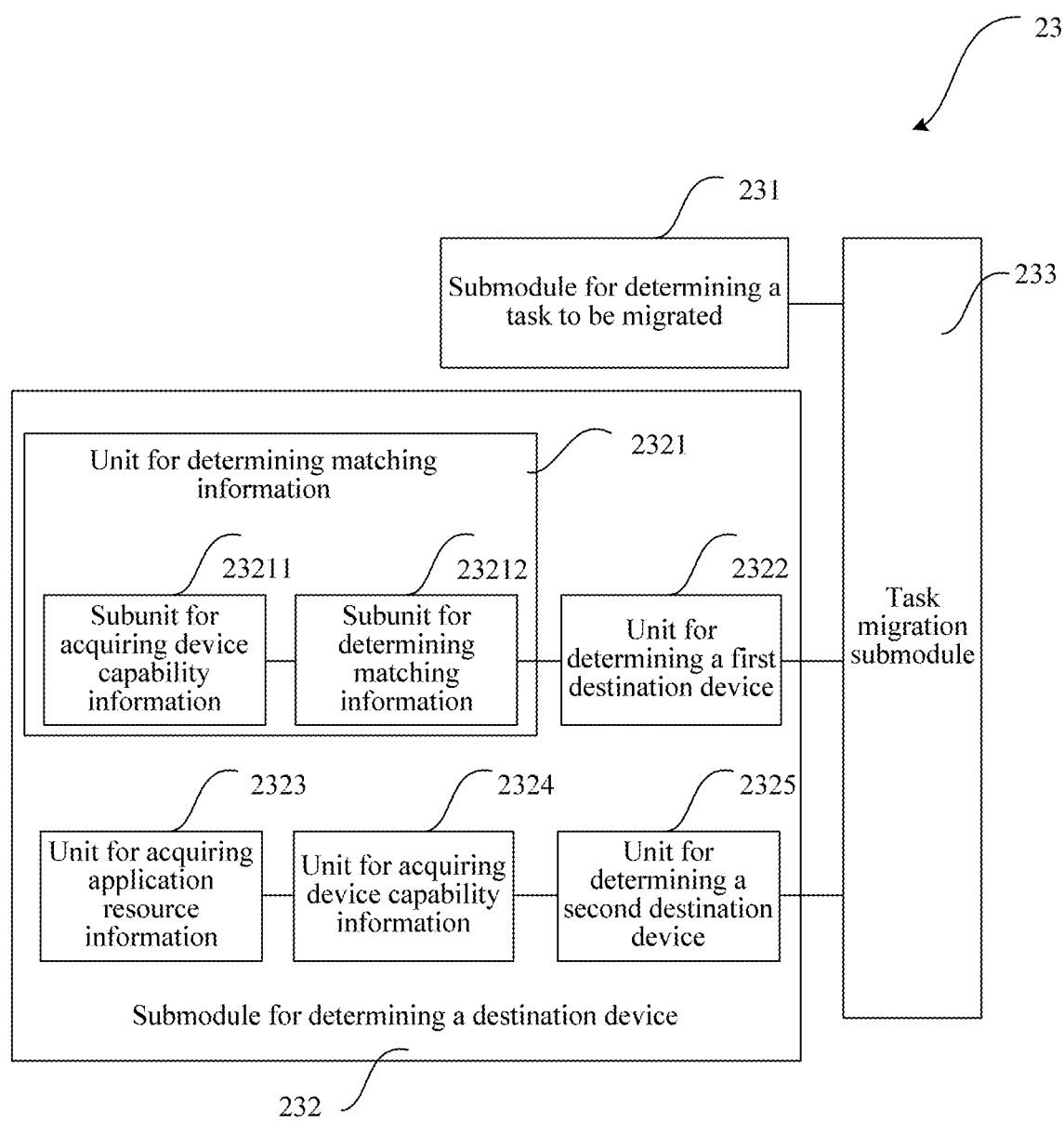
FIG. 4 is a schematic block diagram of a module for controlling task migration in a third apparatus for controlling task migration provided in an example embodiment of the present application.

Optionally, as shown in FIG. 4, the module 23 for controlling task migration comprises: a submodule 231 for determining a task to be migrated, a submodule 232 for determining a destination device, and a task migration submodule 233. The submodule 231 for determining a task to be migrated is configured to determine at least one task to be migrated according to at least one task currently running on at least one source device. The submodule 232 for determining a destination device is configured to determine at least one user currently-available device as a destination device. The task migration submodule 233 is configured to migrate at least one task to be migrated to at least one destination device. In the solution, migration of at least one task between a single source device and a single destination device, migration of at least one task between a single source device and multiple destination devices, or migration of at least one task between multiple source devices and multiple destination devices may be implemented, to cause migration of a task to be more natural and smart, so that a variety of application demands of a user may be better met.

Optionally, the submodule 232 for determining a destination device comprises: a unit 2321 for determining matching information and a unit 2322 for determining a first destination device. The unit 2321 for determining matching information is configured to determine matching information between at least one source device and one or more user currently-available devices. The unit 2322 for determining a first destination device is configured to determine at least one user currently-available device of which the matching information meets a predetermined condition as the destination device. Further, the unit 2321 for determining matching information may comprise: a subunit 23211 for acquiring device capability information and a subunit 23212 for determining matching information. The subunit 23211 for acquiring device capability information is configured to acquire respective device capability information of at least one source device and one or more user currently-available devices. The subunit 23212 for determining matching information is configured to determine the matching information according to the acquired device capability information. In the solution, the user currently-available device that matches the source device well may be determined as the destination device, so as to facilitate subsequent successful migration of a task without interrupting use by a user.

Optionally, the submodule 232 for determining a destination device comprises: a unit 2323 for acquiring application resource information, a unit 2324 for acquiring device capability information, and a unit 2325 for determining a second destination device. The unit 2323 for acquiring application resource information is configured to acquire application resource information used for running at least one task to be migrated. The unit 2324 for acquiring device capability information is configured to acquire respective device capability information of one or more user currently-available devices. The unit 2325 for determining a second destination device is configured to determine at least one user currently-available device as the destination device according to the application resource information and the device capability information. In the solution, the user currently-available device that is suitable for successful running of the task to be migrated may be determined as the destination device, so as to facilitate subsequent successful migration of the task without interrupting use by a user.

Figure 5:
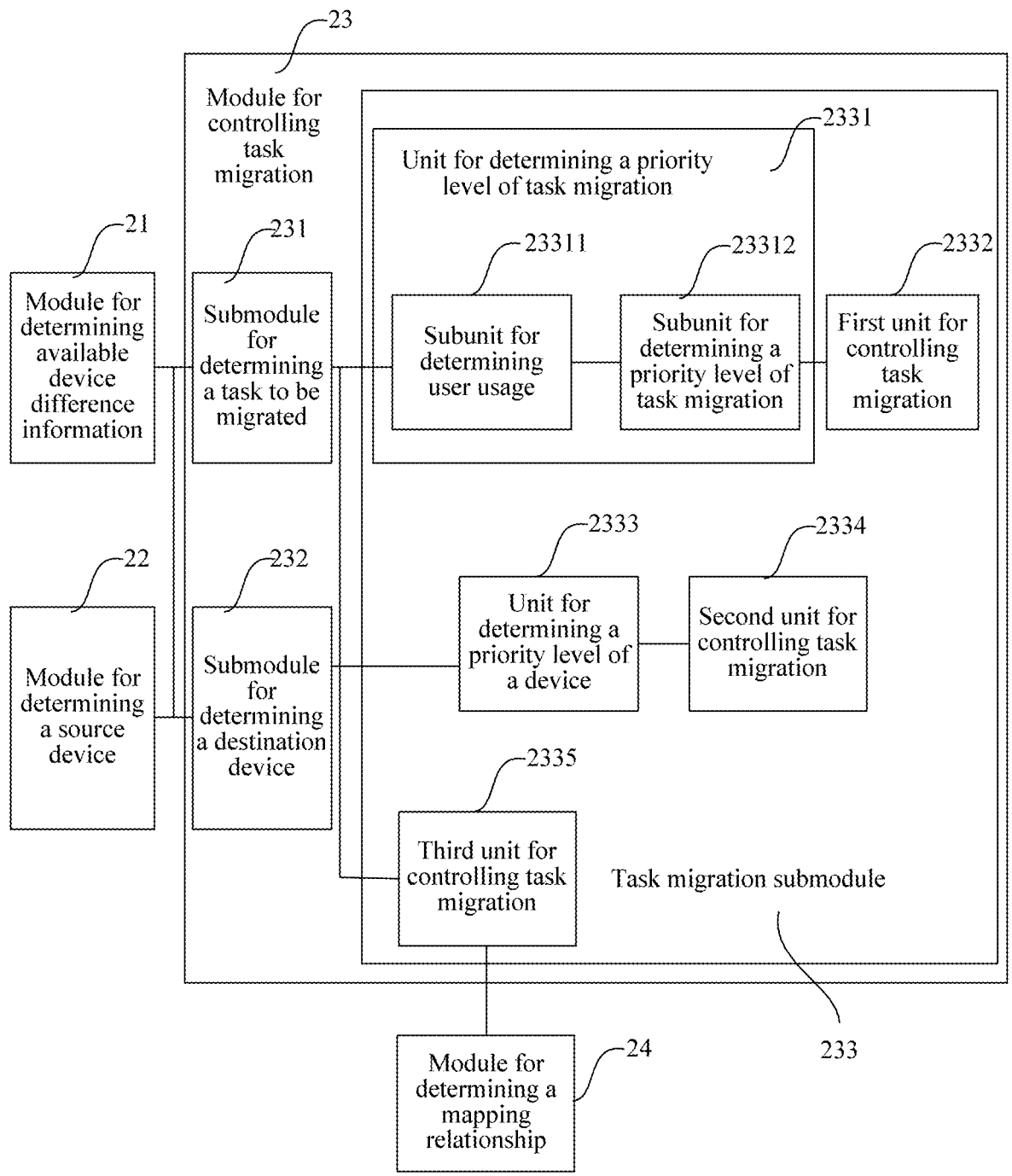
FIG. 5 is a schematic block diagram of a fourth apparatus for controlling task migration provided in an example embodiment of the present application.

Optionally, as shown in FIG. 5, the task migration submodule 233 comprises: a unit 2331 for determining a priority level of task migration and a first unit 2332 for controlling task migration. The unit 2331 for determining a priority level of task migration is configured to determine task migration priority level information of multiple tasks to be migrated. The first unit 2332 for controlling task migration is configured to migrate a corresponding task to be migrated to at least one destination device according to the task migration priority level information. In the solution, a task to be migrated having a relatively high priority level may be migrated preferentially, to cause an application resource of the destination device to preferentially meet running of these tasks, so that efficiency of task migration is improved and demands of a user may be better met.

Further, the unit 2331 for determining a priority level of task migration may comprise: a subunit 23311 for determining user usage and a subunit 23312 for determining a priority level of task migration. The subunit 23311 for determining user usage is configured to acquire respective user usage information of multiple tasks to be migrated. The subunit 23312 for determining a priority level of task migration is configured to determine the task migration priority level information of the multiple tasks to be migrated according to the acquired user usage information. In the solution, a task with which a user is concerned more is migrated preferentially, thereby better meeting demands of actual applications of the user.

Optionally, the task migration submodule 233 comprises: a unit 2333 for determining a priority level of a device and a second unit 2334 for controlling task migration. The unit 2333 for determining a priority level of a device is configured to determine device priority level information of multiple destination devices. The second unit 2334 for controlling task migration is configured to migrate at least one task to be migrated to a corresponding destination device according to the device priority level information. In the solution, the task to be migrated may be preferentially migrated to a destination device having a relatively high priority level, thereby improving convenience of use by the user.

Optionally, the apparatus for controlling task migration further comprises: a module 24 for determining a mapping relationship. The module 24 for determining a mapping relationship is configured to determine a mapping relationship between at least one task to be migrated and at least one destination device. Correspondingly, the task migration submodule 233 comprises: a third unit 2335 for controlling task migration. The third unit 2335 for controlling task migration is configured to migrate a corresponding task to be migrated to a corresponding destination device according to the mapping relationship. In the solution, task migration is controlled on the basis of the mapping relationship, thereby improving efficiency of controlling task migration.

Figure 6:
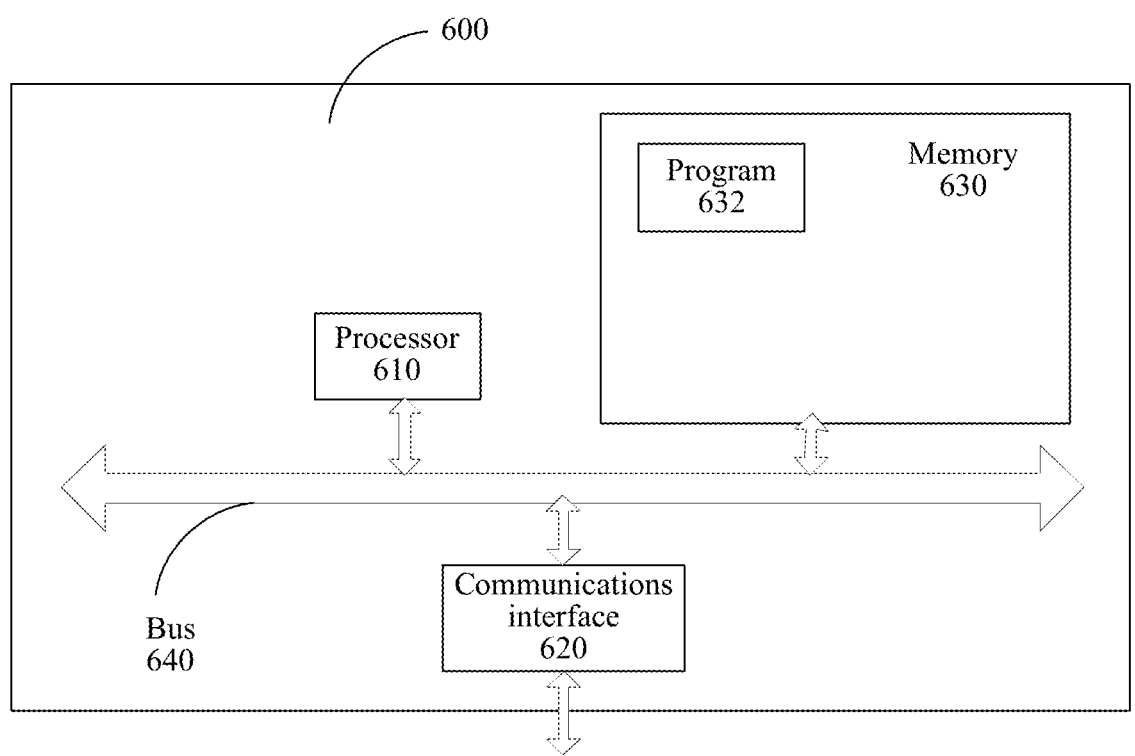
FIG. 6 is a schematic block diagram of a fifth apparatus for controlling task migration provided in an example embodiment of the present application.

FIG. 6 is a schematic block diagram of a fifth apparatus for controlling task migration provided in an embodiment of the present application. An example embodiment of the apparatus 600 for controlling task migration is not limited in the specific embodiment of the present application. As shown in FIG. 6, the apparatus 600 for controlling task migration may comprise:

a processor 610, a communications interface 620, a memory 630, and a communication bus 640. In this case:

the processor 610, the communications interface 620, and the memory 630 accomplish mutual communications via the communication bus 640.

The communications interface 620 is configured to be connected to an external platform or communicate with an external device such as a mobile phone, a computer, and smart glasses.

The processor 610 is configured to execute a program 632, and specifically, may execute relevant steps in any embodiment of the method for controlling task migration above.

For example, the program 632 may comprise a program code, the program code comprising a computer operation instruction.

The processor 610 may be a central processing unit (CPU), or an application specific integrated circuit ASIC, or be configured to be one or more integrated circuits which implement the embodiments of the present application.

The memory 630 is configured to store the program 632. The memory 630 may comprise a random access memory (RAM) memory, or may also comprise a non-volatile memory, for example, at least one magnetic disk memory.

For example, in an example embodiment, the processor 610 executes, by executing the program 632, the following steps: determining available device difference information of a first device set and a second device set, the first device set comprising one or more user previously-available devices, and the second device set comprising one or more user currently-available devices; determining at least one user previously-available device as a source device according to the available device difference information; and migrating at least one task currently running on at least one source device to at least one user currently-available device. In other example embodiments, the processor 610 may further execute, by executing the program 632, the steps mentioned in any other embodiments above, which are no longer elaborated here.

Reference may be made to corresponding description of corresponding steps, modules, submodules, and units in the above embodiment for implementation of steps in the program 632, which are no longer elaborated herein. A person skilled in the art may clearly understand that, for convenience and simplicity of description, reference may be made to the description of a corresponding process in the method embodiment above for specific working process of devices and modules described above, which are no longer elaborated here.

Figure 7:
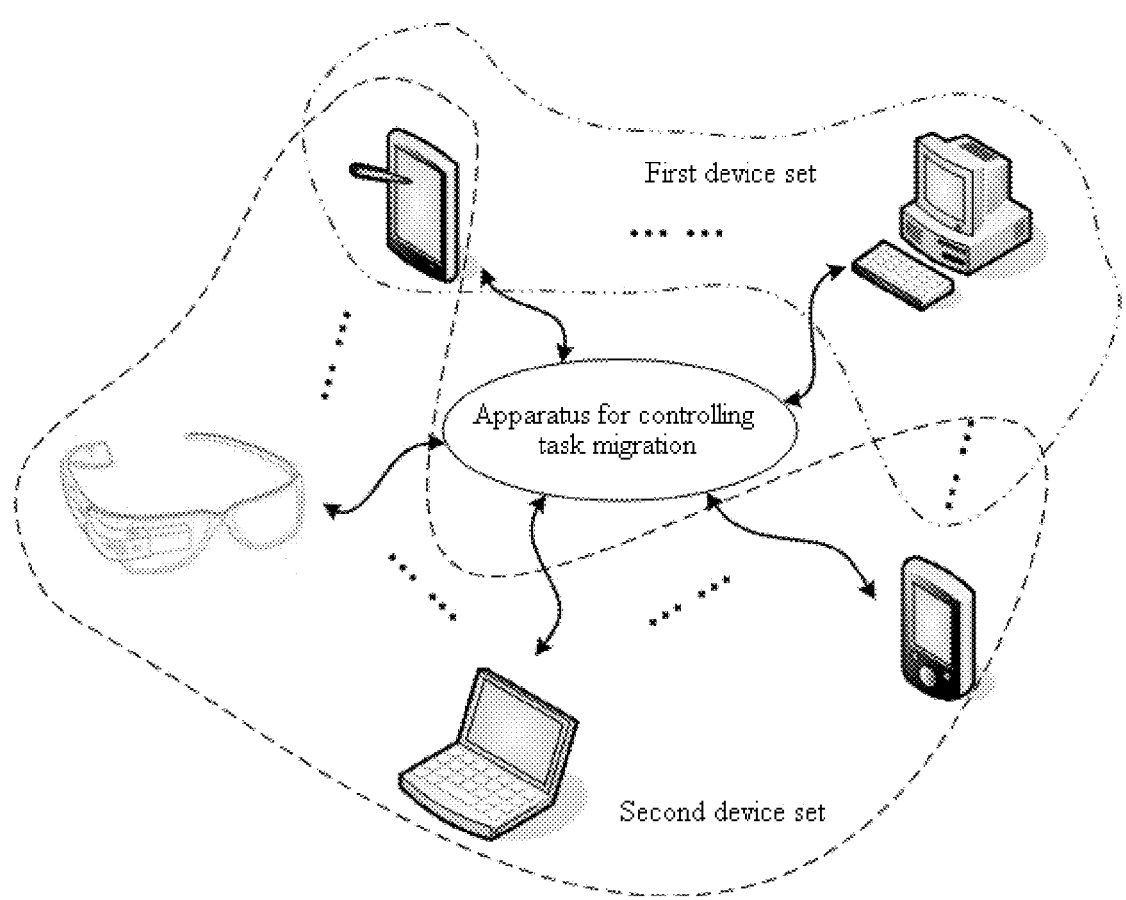
FIG. 7 is a block diagram of the architecture of a system for controlling task migration provided in an example embodiment of the present application.

FIG. 7 is a block diagram of the architecture of a system for controlling task migration provided in an embodiment of the present application. As shown in FIG. 7, the system for controlling task migration comprises: multiple user devices and an apparatus for controlling task migration. The multiple user devices are communicatively connected to the apparatus for controlling task migration. A wired or wireless communicative connection manner may be used for a manner of the communicative connection. The apparatus for controlling task migration has the structure described in any of FIG. 3 to FIG. 6 and the text record corresponding to the figure.

In the system for controlling task migration provided in the embodiment of the present application, the apparatus for controlling task migration may be an independent user device. Alternatively, the apparatus for controlling task migration may be integrated as a functional module in at least one user device, for example, may be integrated in one or more user devices of the multiple user devices. The multiple user devices may comprise, but is not limited to, a mobile phone, a computer, a notebook computer, a tablet computer, smart glasses, a smart watch, a smart wristband, a smart television, and the like.

One or more user devices previously available to a user (that is, the user previously-available devices) among the multiple user devices constitute the first device set, and one or more user devices currently available to a user (that is, the user currently-available devices) among the multiple user devices constitute the second device set. The user devices comprised in the first device set (that is, the user previously-available devices) and the user devices comprised in the second device set (that is, the user currently-available devices) may be partially different (as shown in FIG. 7) or completely different. By using the technical solution provided in the embodiments of the present application, one or more user previously-available devices that are switched from a previously available state to a currently unavailable state may be intelligently found (user devices, other than the user device that is comprised in both the first device set and the second device set, in the first device set shown in FIG. 7), at least one of the one or more user previously-available devices is determined as a source device, and at least one task currently running on at least one source device is migrated to at least one user currently-available device (that is, is migrated to at least one user device comprised in the second device set), so as to implement natural and controllable task migration among multiple devices without interrupting a user's use of a task being migrated, thereby improving convenience of use by a user, and improving user experience.

In the above embodiments of the present application, the sequence numbers and/or the order of the embodiments are merely for ease of description, and do not represent preferences over the embodiments. The embodiments are described with different focuses, and for a part that is not described in detail in an embodiment, reference may be made to related description of other embodiments. Reference may be made to records of corresponding method embodiments for related description of the implementation principles or processes of related apparatus, device or system embodiments, which are no longer elaborated here.

It can be appreciated by a person of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for each specific application, but such example embodiment should not be construed as a departure from the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The software product is stored in a storage medium and comprises several instructions for instructing a computer device (which may be a personal computer, a server, or a network device) or a processor to perform all or a part of the steps of the methods in the embodiments of the present application. The foregoing storage medium comprises: any medium that can store program code, such as a USB flash drive, a removable hard disk, a read-only memory (ROM), a RAM, a magnetic disk, or an optical disc.

In the embodiments of the apparatuses, methods, and systems of the present application, obviously, the members (systems, subsystems, modules, submodules, units, subunits, and the like) or the steps may be split, combined and/or split and recombined. The splits and/or recombinations should be regarded as equivalent solutions of the present application. Moreover, in the above description of the specific embodiments of the present application, features described and/or shown in an example embodiment may be used in one or more other example embodiments in a same or similar manner, may be combined with features in other example embodiments, or may replace features in other example embodiments.

It should be noted that the terms "comprise/comprising" used herein refer to the presence of features, elements, steps or components, but do not exclude the presence or addition of one or more other features, elements, steps or components.

It should finally be noted that: The foregoing example embodiments are only used to describe the present application, but not to limit the present application. A person of ordinary skill in the art can still make various alterations and modifications without departing from the spirit and scope of the present application; therefore, all equivalent technical solutions also fall within the scope of the present application, and the patent protection scope of the present application should be subject to the claims.

What is claimed is:

1. A method, comprising:
   determining, by a system comprising a processor, available device difference information of a first device set and a second device set, the first device set comprising one or more previously-available user devices, and the second device set comprising one or more currently-available user devices, wherein the available device difference information comprises:
   state of availability information of at least one previously-available user device of the one or more previously-available user devices, the at least one previously-available user device being switched from a previously-available user state to a currently-unavailable user state in the first device set;

determining the at least one user previously-available device as at least one source device according to the available device difference information, wherein each source device of the at least one source device corresponds to one previously-available user device of the one or more previously-available user devices; and migrating at least one task currently running on the at least one source device to at least one currently-available user device, wherein the migrating comprises continuing a use, without interruption, of a user of the at least one task being migrated.

2. The method of claim 1, wherein the determining the available device difference information of the first device set and the second device set comprises:

acquiring user previous position information, user current position information, and user device position information, wherein the user device position information comprises:
- previous information of at least one first position of the one or more previously-available user device and current information of at least one second position of the one or more currently-available user device;

determining the first device set according to the user previous position information and the user device position information;

determining the second device set according to the user current position information and the user device position information; and determining the available device difference information according to the first device set and the second device set, wherein the determining the available device difference information comprises:
- determining a difference between two of the user previous position information, the user current position information, and the user device position information.

3. The method of claim 1, wherein the determining the available device difference information comprises:

determining the first device set and the second device set using near-field detection; and determining the available device difference information according to the first device set and the second device set.

4. The method of claim 1, wherein the determining the available device difference information comprises:

determining the first device set and the second device set using human bioelectricity detection; and determining the available device difference information according to the first device set and the second device set.

5. The method of claim 1, wherein the migrating the at least one task comprises:

determining at least one task to be migrated according to at least one task currently running on at least one source device;

determining the at least one currently-available user device as a destination device; and migrating the at least one task to be migrated to at least one destination device.

6. The method of claim 5, wherein the determining the at least one currently-available user device as the destination device comprises:

determining matching information between the at least one source device and the one or more currently-available user devices; and determining the at least one currently-available user device for which the matching information satisfies a predetermined condition as the destination device.

7. The method of claim 6, wherein the determining the matching information between the at least one source device and the one or more currently-available user devices comprises:

acquiring respective device capability information of the at least one source device and the one or more currently-available user devices; and determining the matching information according to the respective device capability information.

8. The method of claim 5, wherein the determining the at least one currently-available user device as the destination device comprises:

acquiring application resource information used for running at least one task to be migrated;

acquiring respective device capability information of the one or more currently-available user devices; and determining the at least one currently-available user device as the destination device according to the application resource information and the respective device capability information.

9. The method of claim 5, wherein the migrating the at least one task to be migrated to the at least one destination device comprises:

determining task migration priority level information of multiple tasks to be migrated; and migrating a corresponding task to be migrated to the at least one destination device according to the task migration priority level information.

10. The method of claim 9, wherein the determining the task migration priority level information of the multiple tasks to be migrated comprises:

acquiring respective usage information of the multiple tasks to be migrated; and determining the task migration priority level information of the multiple tasks to be migrated according to the respective usage information.

11. The method of claim 5, wherein the migrating the at least one task to be migrated to the at least one destination device comprises:

determining device priority level information of multiple destination devices; and migrating at least one task to be migrated to a corresponding destination device according to the device priority level information.

12. The method of claim 5, further comprising:

determining a mapping relationship between the at least one task to be migrated and the at least one destination device; and migrating a corresponding task to be migrated to a corresponding destination device according to the mapping relationship.

13. An apparatus, comprising:

a memory that stores executable modules; and a processor, coupled to the memory, that executes or facilitates execution of the executable modules, comprising:

a first module for determining available device difference information configured to determine the available device difference information of a first device set and a second device set, the first device set comprising one or more previously-available user devices, and the second device set comprising one or more currently-available user devices, wherein the available device difference information comprises:

state of availability information of at least one previously-available user device of the one or more previously-available user devices, the at least one previously-available user device being switched from a previously-available user state to a currently-unavailable user state in the first device set;
a second module for determining a source device configured to determine the at least one previously-available user device of the one or more previously-available user devices as at least one source device according to the available device difference information, wherein each source device of the at least one source device corresponds to one previously-available user device of the one or more previously-available user devices; and
a third module for controlling task migration configured to migrate at least one task currently running on the at least one source device to at least one currently-available user device of the one or more currently-available user devices, wherein migration of the at least one task comprises continuation of at least one use, without interruption, of a user of the at least one task being migrated.

14. The apparatus of claim 13, wherein the first module for determining the available device difference information comprises:
a first submodule for acquiring position information configured to acquire user previous position information, user current position information, and user device position information, wherein the user device position information comprises:
previous information of at least one first position of the one or more previously-available user device and current information of at least one second position of the one or more currently-available user device;
a second submodule for determining the first device set configured to determine the first device set according to the user previous position information and the user device position information;
a third submodule for determining the second device set configured to determine the second device set according to the user current position information and the user device position information; and
a fourth submodule for determining the available device difference information configured to determine the available device difference information according to the first device set and the second device set, wherein the determining the available device difference information comprises:
determining a difference between two of the user previous position information, the user current position information, and the user device position information.

15. The apparatus of claim 13, wherein the first module for determining the available device difference information comprises:
a first submodule of near-field detection configured to determine the first device set and the second device set using near-field detection; and
a second submodule for determining the available device difference information configured to determine the available device difference information according to the first device set and the second device set.

16. The apparatus of claim 13, wherein the first module for determining the available device difference information comprises:

a first submodule of human-bioelectricity detection configured to determine the first device set and the second device set using human bioelectricity detection; and
a second submodule for determining the available device difference information configured to determine the available device difference information according to the first device set and the second device set.

17. The apparatus of claim 13, wherein the third module for controlling task migration comprises:
a first submodule for determining at least one task to be migrated configured to determine the at least one task to be migrated according to at least one task currently running on the at least one source device;
a second submodule for determining a destination device configured to determine the at least one currently-available user device as a destination device; and
a task migration submodule configured to migrate the at least one task to be migrated to the at least one destination device.

18. The apparatus of claim 17, wherein the second submodule for determining the destination device comprises:
a first unit for determining matching information configured to determine the matching information between the at least one source device and the one or more currently-available user devices; and
a second unit for determining a first destination device configured to determine at least one matching currently-available user device for which the matching information satisfies a predetermined condition as the destination device.

19. The apparatus of claim 18, wherein the first unit for determining the matching information comprises:
a first subunit for acquiring device capability information configured to acquire respective device capability information of the at least one source device and the one or more currently-available user devices; and
a second subunit for determining the matching information configured to determine the matching information according to the respective device capability information.

20. The apparatus of claim 17, wherein the second submodule for determining the destination device comprises:
a first unit for acquiring application resource information configured to acquire the application resource information used for running the at least one task to be migrated;
a second unit for acquiring device capability information configured to acquire respective device capability information of the one or more currently-available user devices; and
a third unit for determining a second destination device configured to determine the at least one currently-available user device as the destination device according to the application resource information and the respective device capability information.

21. The apparatus of claim 17, wherein the task migration submodule comprises:
a first unit for determining a priority level of task migration configured to determine the task migration priority level information of multiple tasks to be migrated; and
a second unit for controlling task migration configured to migrate a corresponding task to be migrated to at least one destination device according to the task migration priority level information.

22. The apparatus of claim 21, wherein the first unit for determining the priority level of task migration comprises:

a first subunit for determining user usage configured to acquire respective user usage information of multiple tasks to be migrated; and a second subunit for determining the priority level of task migration configured to determine the task migration priority level information of the multiple tasks to be migrated according to the respective user usage information.

23. The apparatus of claim 17, wherein the task migration submodule comprises:

a first unit for determining a priority level of a device configured to determine device priority level information of multiple destination devices; and a second unit for controlling task migration configured to migrate the at least one task to be migrated to a corresponding destination device according to the device priority level information.

24. The apparatus of claim 17, wherein, the executable modules further comprise:

a fourth module for determining a mapping relationship configured to determine the mapping relationship between the at least one task to be migrated and the at least one destination device; and the task migration submodule further comprises:

a third unit for controlling task migration configured to migrate a corresponding task to be migrated to a corresponding destination device according to the mapping relationship.

25. A system, comprising:

multiple user devices and the apparatus of claim 13, and the multiple user devices are communicatively connected to the apparatus for controlling task migration.

26. The system of claim 25, wherein the apparatus is provided on at least one user device.

27. A computer readable storage apparatus, comprising at least one executable instruction, which, in response to execution, causes an apparatus comprising a processor to perform operations, comprising:

determining available device difference information of a first device set and a second device set, the first device set comprising a first group of previously-available user devices, and the second device set comprising a second group of currently-available user devices, wherein the available device difference information comprises:

state of availability information of at least one previously-available user device the at least one previously-available user device being switched from a previously available user state to a currently-unavailable user state in the first device set;

determining a previously-available device of the first group of previously-available user devices as at least one source device according to the available device difference information wherein each source device of the at least one source device corresponds to one previously-available user device of the first group of previously-available user devices; and migrating a task currently running on the at least one source device to at least one currently-available device of the second group of currently-available user devices, wherein the migrating comprises continuing a use, without interruption, of a user of the at least one task being migrated.

28. An apparatus, characterized by comprising a processor and a memory, the memory storing executable instructions, the processor being connected to the memory via a communication bus, and when the apparatus operates, the processor executes the executable instructions stored in the memory, so that the apparatus performs operations, comprising:

determining available device difference information of a first device set and a second device set, the first device set comprising previously-available user devices, and the second device set comprising currently-available user devices, wherein the available device difference information comprises:

state of availability information of at least one previously-available user device of the previously-available user devices, the at least one previously-available user device being switched from a previously-available user state to a currently-unavailable user state in the first device set;

determining at least one of the previously-available user devices as at least one source device according to the available device difference information, wherein each source device of the at least one source device corresponds to one previously-available user device of the previously-available user devices; and migrating at least one task currently running on the at least one source device to at least one of the currently-available user devices, wherein the migrating comprises continuing a use, without interruption, of a user of the at least one task being migrated.

* * * * *